(12) United States Patent
Fornel et al.

(10) Patent No.: US 7,752,022 B2
(45) Date of Patent: Jul. 6, 2010

(54) METHOD FOR UPDATING A GEOLOGIC MODEL BY SEISMIC AND PRODUCTION DATA

(75) Inventors: Alexandre Fornel, Rueil Malmaison (FR); Mokhles Mezghani, Rueil Malmaison (FR); Jérôme Jaffre, Saint-Nom-la-Breteche (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 394 days.

(21) Appl. No.: 11/444,476

(22) Filed: Jun. 1, 2006

(65) Prior Publication Data
US 2007/0005253 A1    Jan. 4, 2007

(30) Foreign Application Priority Data
Jun. 3, 2005   (FR)   ................................... 05 05612

(51) Int. Cl.
G06F 7/60 (2006.01)
G06F 7/48 (2006.01)
G06F 19/00 (2006.01)
G01V 1/00 (2006.01)

(52) U.S. Cl. .............................. 703/10; 703/2; 702/11; 702/12; 702/13; 702/14; 702/16; 364/421; 367/73

(58) Field of Classification Search .................. 703/10, 703/2; 702/11, 12, 13, 14, 16; 364/421; 367/73
See application file for complete search history.

(56) References Cited

U.S. PATENT DOCUMENTS

| | | | | |
|---|---|---|---|---|
| 5,764,515 A | * | 6/1998 | Guerillot et al. ............... | 702/2 |
| 5,798,982 A | * | 8/1998 | He et al. ........................ | 367/73 |
| 5,838,634 A | * | 11/1998 | Jones et al. .................... | 367/73 |
| 6,094,621 A | * | 7/2000 | Hanitzsch et al. .............. | 702/16 |
| 6,381,543 B1 | * | 4/2002 | Guerillot et al. ............... | 702/13 |
| 6,529,833 B2 | * | 3/2003 | Fanini et al. .................... | 702/7 |
| 6,549,854 B1 | * | 4/2003 | Malinverno et al. ........... | 702/16 |
| 6,775,578 B2 | * | 8/2004 | Couet et al. .................... | 700/28 |

(Continued)

OTHER PUBLICATIONS

Toinet, Sylvain. "4D Feasibility and Calibration Using 3D Seismic Modeling of Reservoir Models" Society of Petroleum Engineers, vol. SPE, No. 88783, Oct. 2004.*

(Continued)

*Primary Examiner*—Kamini S Shah
*Assistant Examiner*—Shambhavi Patel
(74) *Attorney, Agent, or Firm*—Antonelli, Terry, Stout & Kraus, LLP.

(57) ABSTRACT

The invention is a method, having applications for the development of reservoirs, for predicting the production of an underground reservoir, comprising generating and updating a parameterized geologic model from production data and seismic data and in particular 4D seismic data which may be used in development of oil reservoirs. According to the method, production data are simulated from the geologic model and a flow simulator, and a petro-elastic depth model is deduced therefrom. A depth/time conversion model is then defined, by means of which the petro-elastic model is converted into time. The model is adjusted by correcting the lag induced by the depth/time conversion and by recalibrating the model. The geologic model is optimized by comparing, through an objective function, the real measurements with the simulation responses (production responses and seismic attributes in time) by updating in particular the depth/time conversion model.

7 Claims, 3 Drawing Sheets

U.S. PATENT DOCUMENTS

| | | | |
|---|---|---|---|
| 7,280,952 B2 * | 10/2007 | Butler et al. | 703/10 |
| 2004/0148148 A1 * | 7/2004 | Butler et al. | 703/10 |
| 2008/0255816 A1 * | 10/2008 | Neville | 703/10 |

OTHER PUBLICATIONS

In Depth Geophysics Pty Ltd. "Outsourced Seismic Interpretation" Apr. 2002.*

Floris et al. "Methods for Quantifying the Uncertainty of Production Forecasts: A Comparative Study", Petroleum Geoscience, vol. 7, Supplement, May 2001.*

Jourdan et al. "Integrating 4D seismic results into the reservoir simulation model. The Girassol Case Study." EAGE 66th Conference and Exhibition Jun. 2004.*

Gosselin, et al. "History Matching Using Time-lapse Seismic (HUTS)", Society of Petroleum Engineers, 2003.*

Huang et al. "Reservoir Characterization by Integration of Time-Lapse Seismic and Production Data", Society of Petroleum Engineers 1997.*

Aanonsn et al. "Effect of Scale Dependent Data Correlations in an Integrated History Matching Loop Combining Production Data and 4D Seismic Data", Society of Petroleum Engineers, 2003.*

Gosselin et al. "Integrated History-Matching of Production and 4D Seismic Data", Society of Petroleum Engineers 2001.*

Waggoner et al. "Improved Reservoir Modeling with a Time-Lapse Seismic in a Gulf of Mexico Gas Condensate Reservoir", Society of Petroleum Engineers, 2002.*

Falcone et al. "PetroElastic Modeling as Key Element of 4D History Matching: A Field Example", Society of Petroleum Engineers, 2004.*

Sylvain Toinet: "4D Feasibility and Calibration Using 3D Seismic Modeling of Reservoir Models", Society of Petroleum Engineers, vol. SPE, No. 88783, (Oct. 10, 2004)-(Oct. 13, 2004), pp. 1-4, XP002364414, Abu Dhabi.

M. Mezghani, et al: "History Matching and Quantitative Use of 4D Seismic Data for an Improved Reservoir Characterization", Society of Petroleum Engineers, vol. SPE, No. 90420, (Sep. 26, 2004), pp. 1-10, XP002364415, Houston.

O. Gosselin, et al: "History Matching Using Time-Lapse Seismic (HUTS)", Society of Petroleium Engineers, vol. SPE, No. 84464, (Oct. 5, 2003)-(Oct. 8, 2003), pp. 1-15, XP002364416, Denver.

* cited by examiner

METHOD FOR UPDATING A GEOLOGIC MODEL BY SEISMIC AND PRODUCTION DATA

BACKGROUND OF THE INVENTION

1. Field of the Invention

The present invention relates to a method for predicting the production of an underground reservoir by updating a geologic model constrained by production data and seismic data in time. The method is part of reservoir characterization, whose objective is to provide reliable images of reservoirs in order to better predict their behavior and to optimize their development scheme.

2. Description of the Prior Art

The following documents illustrate the state of the art and are discussed by their reference number in the description hereafter.

1. F. ANTERION. *History Matching: A One Day Long Competition: Classical Approaches Versus Gradient Method.* First international forum on reservoir simulation, Alpbach, Austria, 1998.
2. F. ANTERION, R. EYMARD and B. KARCHER. *Use of Parameter Gradients for Reservoir History Matching.* Symposium on Reservoir Simulation of the Society of Petroleum Engineers, Houston, Tex., 1989.
3. U. G. ARAKTINGI and W. M. BASHORE. *Effects of Properties in Seismic Data on Reservoir Characterization and Consequent Fluid Flow Predictions When Integrated with Well Logs.* SPE 24752, 67th Annual Technical Conference and Exhibition, Washington D.C., USA, 1992.
4. A. BAMBERGER, G. CHAVENT, and P. LAILLY. *Une Application de La Théorie du Contrôle à un Problème Inverse de Sismique.* Les annales de Géophysique Vol. 3, 1977.
5. R. BISSEL. *Calculating Optimal Parameters for History Matching.* 4th European Conference on the Mathematics of Oil Recovery, Roros, Norway, 1994.
6. R. BISSEL, J. E. KILLOUGH and Y. SHARMA. *Reservoir History Matching Using the Method of Gradients on a Workstation.* SPE 24265, Stavanger, Norway, 1992.
7. C. BOGAN, D. JOHNSON, M. LITVAK and D. STAUBER. *Building Reservoir Models Based on 4D Seismic and Well Data in Gulf of Mexico Oil Fields.* Annual Technical Conference and Exhibition, 2003.
8. J. BRAC, P. Y. DÉQUIREZ, F. NERVÉ, C. JACQUES, P. R. V. LAILLY and D. TRAN VAN HIEU. *Inversion with a Priori Information: An Approach to Integrated Stratigraphic Interpretation.* 58th Annual International SEG Meeting, Anaheim, Calif., 1988.
9. P. CARRION. *Inverse Problems and Tomography in Acoustics and Seismology.* Penn Publishing Company, 1987.
10. J. CÉA. Optimisation: *Théories et Algorithmes.* Dunod, 1971.
11. M. CHARARA, I. MAGNIANT, Y. MANIN, J.-P. DELHOMME and N. EBERLÉ. *The Benefit of Coupling Geophysical Inversion Problems with Fluid Flow Simulation.* ECMOR VII, Baveno, Lago Maggiore, Italy, 2000.
12. G. CHAVENT. *Analyse Fonctionnelle et Identification des Coefficients Répartis Dans Les Équations Aux Dérivées Partielles.* PhD Thesis, Université Paris VI, 1971.
13. G. CHAVENT. *Identifiability of Parameters in Output Least Square Formulation.* New York. 1987.
14. G. CHAVENT, M. DUPUY and P. LEMONNIER. *History Matching by Use of Optimal Theory.* SPE 4627, Las Vegas, Nev., 1973.
15. L. COSTA-REIS, G. DE MARSILY, and R. ESCHARD. *Intégration de Données Dynamiques Dans un Modèle Géostatistique de Réservoir.* PhD Thesis, Université Paris VI, 2000.
16. J.-E. DENNIS and R.-B. SCHNABEL. *Numerical Methods for Unconstrained Optimization and Non-Linear Equation.* Englewood Cliffs, N.J. 1983.
17. P. Y. DEQUIREZ and V. RICHARD. *Application of Inversion to Integrated Stratigraphic Interpretation.* Revue de l'Institut Français du pétrole, Vol. 45, no pp.-397, 416. 1990.
18. P. F. EDOA. *Inversion de Formes Géologiques en Ingénierie De Gisements en en Utilisant les Données de Production.* PhD Thesis, Université Paul Sabatier, 1999.
19. G. S. FEITOSA, L. CHU, L. G. THOMPSON and A. C. REYNOLDS. *Determination of Permeability Distribution from Well Test Pressure Data.* SPE 26047, 1993.
20. R. FLETCHER. *Practical Methods of Optimization.* New York. 1987.
21. F. GASSMAN N. *Über die Elastiztät Poröser Medien.* Vierteljahrresschr.Naturforschung Gesellschaft Vol. 96, pp. 1-23, Zurich, 1951.
22. O. GOSSELIN, A. COMINELLI, S. VAN DER BERG and S.-D. CHOWDHURY. *A Gradient-Based Approach for History Matching of Both Production and 4D Seismic Data.* ECMOR VII, Baveno, Lago Maggiore, Italy, 2000.
23. D. GUÉRILLOT and W. BEYDOUN. *Reservoir Boundary Identification from Seismic Imaging for Well Test Analysis.* SPE 26463, 68th Annual Technical Conference and Exhibition, Houston, Tex., USA, 1993.
24. L.-Y. HU. *Gradual Deformation and Iterative Calibration of Gaussian-Related Stochastic Models.* Mathematical Geology Vol. 32, pp. 87-108, 2000.
25. L.-Y. HU. *Combinaison of Dependent Realizations within the Gradual Deformation Method.* Mathematical Geology Vol. 34, pp. 953-963, 2002.
26. L.-Y. HU and G. BLANC. *Constraining a Reservoir Facies Model to Dynamic Data Using a Gradual Deformation Method.* $6^{th}$ Conference on the Mathematics of Oil Recovery, Peebles, 1998.
27. P. JACQUARD and C. JAIN. *Permeability Distribution from Field Pressure Data.* SPE Journal pp. 281-294, 1965.
28. P. JACQUARD and C. JAIN. *Recherche sur L'interprétation des Mesure de Pression.* 2ème Colloque de l'ARTFP, Rueil-Malmaison, France, 1965.
29. J. W. JENNINGS, D. S. MC GREGOR and R. A. MORSE. *Simultaneous Determination of Capillary Pressure and Relative Permeability by Automatic History Matching.* SPE 14418, 1988.
30. A.-G. JOURNEL and DEUTSCH C.-V. *Power Averaging for Block Effective Permeability.* SPE Vol. 15128, $56^{th}$ California Regional Meeting of the Society of Petroleum Engineers, Oakland. 1986.
31. V. KRETZ, M. LE RAVALEC-DUPIN and F. ROGGERO. *An Integrated Reservoir Characterization Study Matching Production Data and 4D seismic.* Annual Technical Conference and Exhibition, 2002.
32. G. KRUNETZ. *Quelques Examples D'analyse D'enregistrements Sismiques.* Geophysical Prospecting Vol. 11, pp. 409-422, 1963.
33. J. LANDA and R. HORNE. *A Procedure to Integrate Well Test Data, Reservoir Performance History and 4D Seismic Information Into a Reservoir Description.* SPE 38653, Annual Technical Conference and Exhibition, San Antonio, Tex., USA, 1997.

34. M. LAVERGNE. *Méthodes Sismiques*. Ecole Nationale Supérieure du Petrole et des Moteurs, Editions Technip, Paris. 1986.
35. M. LE RAVALEC, NOETINGER BENOÎT, and L.-Y. HU. *The FFT Moving Average (FFT-MA) Generator: An Efficient Numerical Method for Generating and Conditioning Gaussian Simulation*. Mathematical Geology Vol. 32, pp. 701-723, 2000.
36. M. LE RAVALEC-DUPIN and B. NOETINGER. *Optimization with the Gradual Deformation Method*. Mathematical Geology Vol. 34, No. 2, pp. 125-142, 1-2-2002.
37. J. L. LIONS. *Contrôle Optimal de Systèmes Gouvernés Par des Équations aux Dérivées Partielles*. Dunod, 1968.
38. F. MANSANNÉ. *Algorithmes Génétiques: Applications à L'inversion Sismique et à L'extrapolation*. PhD Thesis, UPPA, Pau, 2000.
39. M. MEZGHANI, A. FORNEL, V. LANGLAIS and N. LUCET. *History Matching and Quantitative Use of 4D Seismic Data for an Improved Reservoir*. SPE 90420, 2004.
40. M. MEZGHANI, A. FORNEL, V. LANGLAIS and N. LUCET. *Quantitative Use of 4D Seismic Data For Geological Modeling & Reservoir Characterization Through History Matching*. Paris, 2004.
41. M. MEZGHANI, F. ROGGERO and J. P. RAYMOND. *Optimal Location of Pilot Points in History Matching*. ECMOR VII, Baveno, Italy, 2000.
42. R. W. NELSON. *In Place Measurement of Permeability in Heterogeneous Media; Theory of a Proposed Method*. Geophys. Res. Vol. 66(5), pp. 2469-2478, 1960.
43. D. RAHON, G. BLANC and D. GUÉRILLOT. *Gradient Method Constrained by Geological Bodies for History Matching*. SPE 36568, 1996.
44. R. RAMAMOORTHY, W. F. MURPHY and C. COLL. *Total Porosity Estimation in Shaly Sands From Shear Modulus*. SPWLA 36th Annual Logging Symposium Transactions., 1995.
45. P. RENARD and G. DE MARSILY. *Calculating Equivalent Permeability: A Review*. Advances in Water Resources, Vol. 20, no 5-6, pp. 253-278, 1997.
46. F. ROGGERO and D. GUÉRILLOT. *Gradient Method and Bayesian Formalism—Application to Petrophysical Parameter Characterization*. 5th ECMOR, Leoben, Austria, 1996.
47. S. RONEN, C. ECONOMIDES and VARVIK. *Synergetic Interpretation of Well Tests and Seismic Data for Reservoir Characterization*. 54th EAEG Meeting, Paris, France, 1992.
48. B. H. RUSSEL. *Introduction to Seismic Inversion Methods*. SEG 1988.
49. A. TARANTOLA. *Inverse Problem Theory: Method for Data Fitting and Model Parameter Estimation*. Elseiver. 1987.
50. X. H. WEN and J. J. HERNANDEZ. *Upscaling Hydraulic Conductivities in Heterogeneous Media: an Overview*. Journal of Hydrology, Vol. 183, no pp. 9-32, 1996.
51. T. YAO and A.-G. JOURNEL. *Porosity Modeling in a W. Texas Carbonate Reservoir Conditionned to Seismic Data: Solving the Difference of Scale Problem*. SPE, Annual Technical Conference and Exhibition, 1998.
52. I. ZABALZA, G. BLANC, D. COLLOMBIER and M. MEZGHANI. *Use of Experimental Design in Resolving Inverse Problems—Application to History Matching*. ECMOR VII, Baveno, Italy, 2000.

To update geologic models, integration of the dynamic data is based on the inverse problem theory. Some parameters of the geologic model, such as porosity or permeability, are adjusted iteratively to fit observation data, such as production data for example. As in any inverse problem, there is not one and only solution. In order to reduce uncertainties on the production prediction, it is necessary to integrate more observation data (logs, production data, seismic data, . . . ), which allows to better constrain the models.

SUMMARY OF THE INVENTION

The method according to the invention allows simultaneous integration of several types of data, whether static or dynamic. This allows considerable reduction of the space of the allowable geologic models and therefore better predicts the behavior of the reservoirs being studied. Some methods already use joint integration of 4D seismic and production data in history matching, see references 7, 31, and 39 above, but these documents describe the use of 4D seismic data in depth.

Now, the seismic attributes (in particular impedances) are first expressed as a function of the wave travel times. It is only after a time/depth conversion stage that the impedances are expressed in depth. One of the original features of the method according to the invention is directly working with seismic attributes in time. This method also affords another advantage: it allows calibration of the impedances, but also the travel times for the entire reservoir, in other words the global thickness in time of the reservoir.

Such a method requires implementation of a depth/time conversion to transcribe in time the seismic attributes calculated in depth by a petro-elastic model, a filtering algorithm for adjusting the impedance values in a passband close to that of the seismic method, and various upscaling methods for working between the different measurement scales.

The present invention is a method for predicting the production of an underground reservoir, comprising generating a parameterized geologic model from measurements of the seismic data in time and production measurements and updating the geologic model by an inversion process. The method comprises the following stages:

simulating dynamic production data from the geologic model and a flow simulator providing flow simulations;

simulating a petro-elastic model in depth from the geologic model and the flow simulator;

determining a depth/time conversion model;

converting the petro-elastic model into a petro-elastic model in time;

simulating the seismic data in time from the petro-elastic model in time;

optimizing the geologic model by comparing, with an objective function, the simulated dynamic production data and the simulated seismic data in time by updating at least the depth/time conversion model;

starting again from the first stage) until a minimum is obtained for the objective function;

predicting the production of the underground reservoir from flow simulations providing from the optimized geologic model.

The petro-elastic model in time can be adjusted by correction of a lag induced by the depth/time conversion.

The dynamic data can be reservoir production, pressure and saturation data.

The petro-elastic model can comprise data from 4D seismic surveys.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The invention predicts the production of an underground reservoir by developing an optimization loop around a flow simulator, including a petro-elastic model and a depth/time conversion model for simulation of the seismic responses. Development of this loop allows optimization of a geologic model described on a fine grid, on which the production data predictions are based. The method rests on the inverse problem theory. It can thus be broken up into two modules:

The direct module 13 (FIG. 1): It allows construction of a modelling chain allowing numerical simulation of the synthetic responses relative to the data to be integrated. This direct module has several algorithms allowing going from the geologic model 1 either to the simulated production data 4' or to simulated seismic attributes $I_p$-$I_s$(Time) and $T_p$ 8 through three possible processing paths. The first path proceeds from the geological model 1 through Fine petrophysical model: $\phi$, k 2, Upscaling 3, Rough petrophysical model: $\emptyset$, K 3", Flow simulation 4 to the Simulated production data 4'. The second path proceeds from the Flow simulation 4', to pressure/saturation 4" through Downscaling 3' through Fine petrophysical model: $K_M$-$K_{GR}$-$\mu$-$\rho_{Gr}$ 2' to Petro-elastic simulations 5, Lateral upscaling 5', Z/T Conversion 6, Squeeze/Stretch 6', Filter sampling 7 and to Simulated Ip-Is(Time) and Tp8. $I_p$, $I_s$ (Time) and $T_p$ are simulated seismic attributes in time, The third path proceeds from the geological model facies 1 to fine petrophysical model: $K_M$-$K_{Gr}$-$\mu$-$\rho_{Gr}$ 2', with an input from Downscaling 3' through Petro-elastic simulation 5, Lateral upscaling 5', Z/T Conversion 6, Squeeze/Stretch 6', Filtering Sampling 7 to Simulated $I_p$-$I_s$ (Time) and $T_p$ 8.

Figure 1:
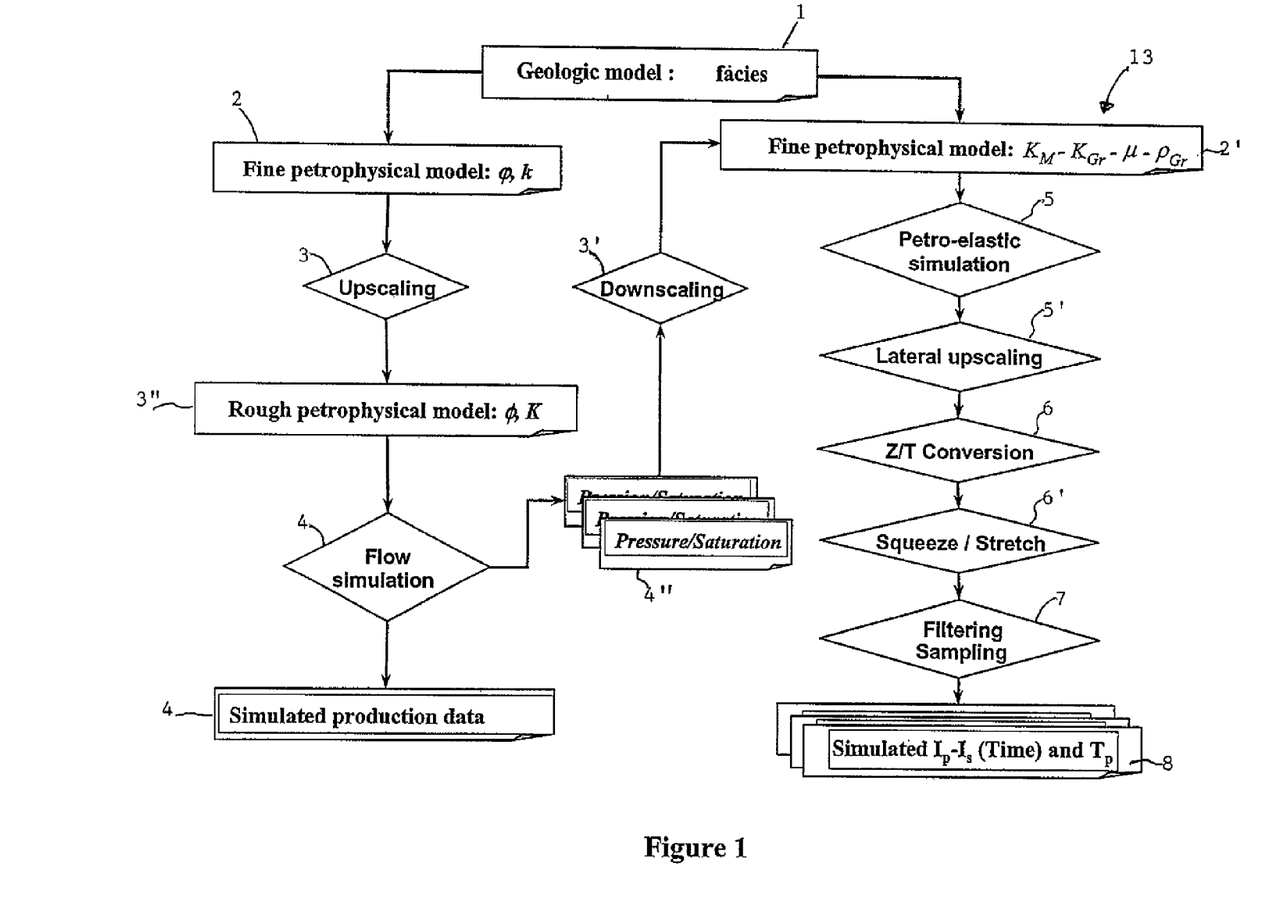
FIG. 1 illustrates the direct module allowing obtaining of the simulation responses.

The direct module allows obtaining the simulation responses: production responses (oil flow rates, gas/oil ratio and water-cut (water/oil ratio) for each well);

seismic attributes in time (impedances for P and S waves, loop travel time of the P waves for the entire reservoir).

Figure 3:
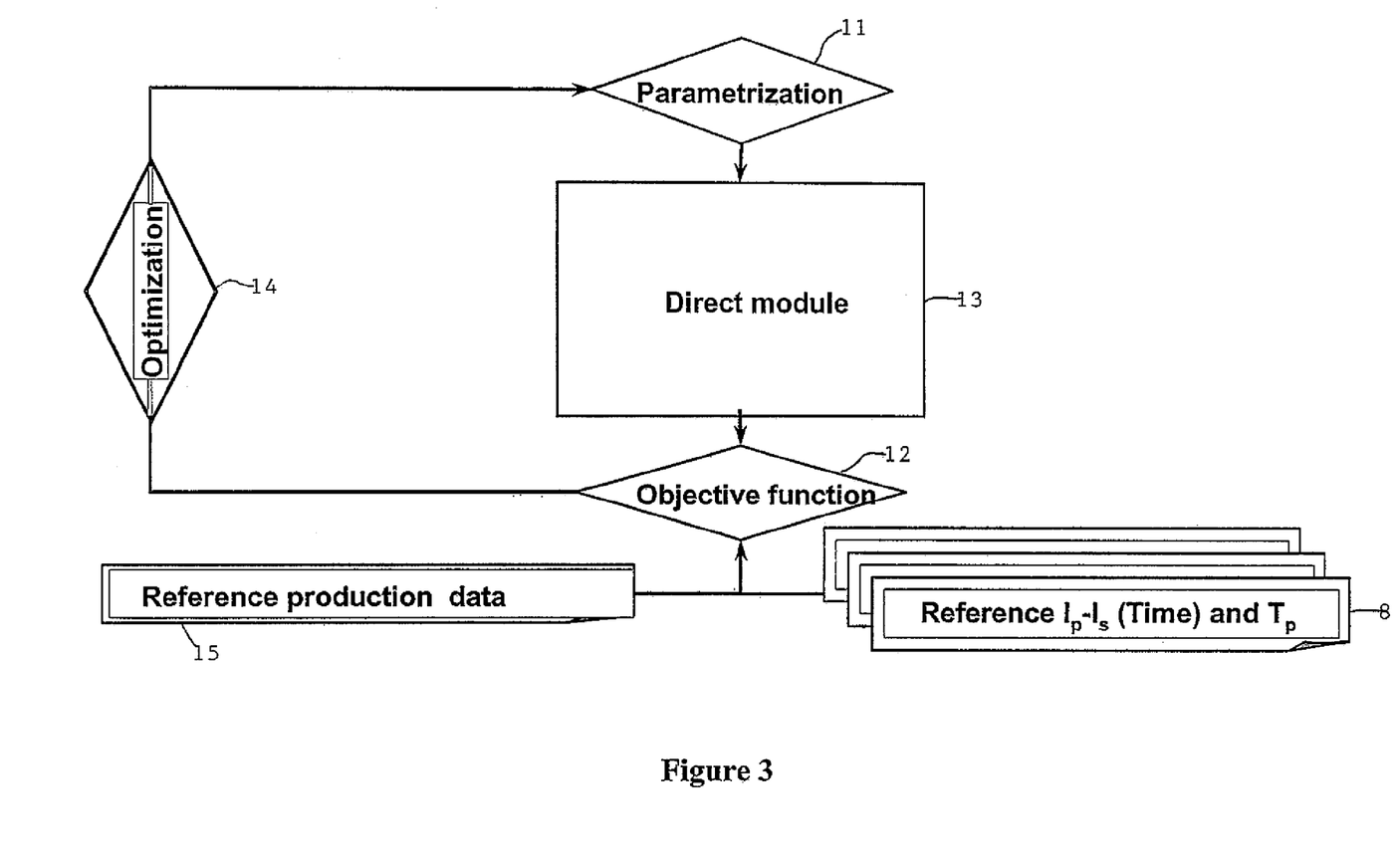
FIG. 3 illustrates the inverse module.

The inverse module (FIG. 3): It allows minimizing an objective function measuring the difference between the simulation results of the direct module and the data by changing a certain number of parameters of the direct module. These parameters can be relative to:

the geologic model (facies, porosity and permeability distribution, etc.), the flow simulation model (relative permeabilities, skins, etc.), the petro-elastic model (Gassmann law, etc.), the depth/time conversion model (velocity law).

According to a particular embodiment of the invention, the optimization loop is used to calibrate the production data and the 4D seismic data, by updating the geologic model.

The method uses seismic data in time, that is, a function of the travel times of the seismic waves and not as a function of depth. The main challenge here is integration of a depth/time conversion process with updating during the optimization process.

1—The Direct Module

FIG. 1 illustrates the various stages of the direct module.

A) Determination of the Dynamic Production Data

1) Generation of a Geologic Model 1

Generation of geologic model 1 is achieved with geostatistical modelling tools (See references 24 and 36). A geostatistical model based on a random Gaussian field is used to generate the porosity fields. The horizontal and vertical permeabilities are obtained with a co-simulation technique.

2) Simulator Upscaling 3

An important factor for flow simulation is the grid size. It is always preferable to work on a simulation grid 2 as fine as possible in order to capture the reservoir heterogeneities and the spatial distribution of the saturations. However, for obvious practical reasons, a compromise has to be made between a detailed analysis and calculating capacities and time. Thus, flow simulations are generally carried out on a rough grid 3", requiring an upscaling stage 3 to calculate the equivalent properties of the reservoir on the rough grid cells. Many analytical (the power averaging method for example) or numerical (solution of a local flow problem) techniques have been developed (See references 45 and 50). The upscaling used is a power law, which makes it possible to choose an arithmetic, geometric or harmonic mean [See reference 30]:

$$K = \left(\frac{1}{V}\int_V k(x)^p \, dV\right)^{1/p} \tag{0.1}$$

3) Flow Simulation 4

Flow simulation 4 is necessary to constrain the geologic model by the measured bottomhole production data (gas/oil, water/oil (water cut) ratios for example). In order to calculate the seismic attributes, the saturations and pressures are required as flow simulator output data (application of the mass conservation and Darcy's laws).

B) Determination of a Petro-Elastic Model

1) Downscaling the Geologic Model 3'

A downscaling procedure 3' is then carried out to transcribe the pressure/saturation 4" of the rough grid of the flow simulation to the fine grid 2 of the geologic model 1. The method of the invention is based on a simple mapping of the fine grid. More sophisticated techniques could be considered, but the calculation time required would probably become prohibitive for the desired history matching. This downscaling stage 3' allows a petro-elastic model to be applied at the scale of the geologic model 1, and per facies, which is much more rigorous than per geologic unit.

2) Determination of the Fine Petro-Elastic Mode 2'

The compression and shear impedances are defined as the product of the density of the rock saturated with fluid $\rho_B$ (referred to as wet rock) by the velocities of propagation of the seismic waves $V_P$ and $V_S$:

$$I_P = \rho_B V_P \text{ and } I_S = \rho_B V_S \text{ with } V_P = \sqrt{\frac{3K+4\mu}{3\rho_B}} \text{ and } V_S = \sqrt{\frac{\mu}{\rho_B}} \tag{0.2}$$

where K designates the incompressibility modulus of the wet rock and $\mu$ the shear modulus.

Besides, if it is desired to take into account the pressure and saturation variation effects on the compression $V_P$ and shearing $V_S$ rates, the Hertz model is implemented:

$$V_P(P_c - P_p) = V_P(\Delta P_a)\left(\frac{P_c - P_p}{\Delta P_a}\right)^{h_P} \text{ and } V_S(P_c - P_p) = V_S(\Delta P_a)\left(\frac{P_c - P_p}{\Delta P_a}\right)^{h_S} \quad (0.3)$$

with:
$P_c$ the confining pressure,
$P_p$ the pore pressure,
$\Delta P_a$ the asymptotic differential pressure,
$h_P$ and $h_S$ the Hertz coefficients for the P and S waves.

The first stage calculates the density of the wet rock $\rho_B$ by means of the formula as follows:

$$\rho_B = (1-\phi)\rho_{Gr} + \phi\rho_F \quad (0.4)$$

where $\rho_{Gr}$ designates the grain density (defined for each facies) and $\phi$ the porosity (a constant per facies or a value per pixel). The downscaling stage allows calculation of the fluid density $\rho_F$ by taking account of the pressure effects:

$$\rho_F = \rho_O(P_O)S_O + \rho_W(P_W)S_W + \rho_G(P_G)S_G \quad (0.5)$$

where $(\rho_O, \rho_W, \rho_S)$, $(S_O, S_W, S_S)$ et $(P_O, P_W, P_S)$ are the phase densities, saturations and pressures. The phase densities are deduced from pressure-density tables.

Calculation of the incompressibility modulus of the wet rock K is carried out by means of the Gassmann equations [21]:

$$K = K_M + \frac{\left[1 - \frac{K_M}{K_{Gr}}\right]}{\frac{\phi}{K_F} + \frac{1-\phi}{K_{Gr}} - \frac{K_M}{K_{Gr}^2}} \text{ and } \frac{1}{K_F} = \frac{S_O}{K_O} + \frac{S_W}{K_W} + \frac{S_G}{K_G} \quad (0.6)$$

where $K_{Gr}$ designates the incompressibility modulus of the grain (a constant per facies depending on the composition of the rock), $K_F$ the incompressibility modulus of the fluid, $K_M$ the incompressibility modulus of the porous matrix and $(K_O, K_W, K_G)$ the moduli for each phase (from pressure-incompressibility modulus tables).

Incompressibility modulus $K_M$ is selected by the user (a constant per facies, generally obtained from previous laboratory measurements), or it can result from an experimental law taking account of the effects of porosity [See reference 44]:

$$K_M = K_{Gr}(3.88\phi^2 - 3.9\phi + 1) \quad (0.7)$$

Shear modulus $\mu$ can also be selected by the user (a constant per facies, also obtained from laboratory measurements), or it can result from an experimental model:

$$\mu = \mu_{Gr}(2.19\phi^2 - 3.48\phi + 1) \quad (0.8)$$

C) Determination of a Petro-Elastic Model in Depth 5

Thus, if the incompressibility moduli $K_{Gr}$ and $K_M$ is set as well as shear modulus $\mu$ and grain density $\rho_{Gr}$, the seismic velocities and impedances can be calculated as a function of depth (or more precisely as a function of coordinates (x,y,z)).

D) Determination of the Seismic Attributes in Time

1) Lateral Upscalinq 5'

The next objective is to laterally reconcile the modelling scale with the seismic pixels. Here again, a power averaging formula is used to determine an arithmetic mean.

2) Conversion of the Petro-Elastic Model in Depth to the Time Domain 6

The original feature and the main challenge of this methodology is in the history matching process seismic attributes in time and a depth/time conversion has to be carried out. A velocity model allows expression of the impedances obtained in depth after the petro-elastic model, as a function of the loop travel time of the seismic waves. The velocity model used is calculated by the petro-elastic simulation model 5, which affords the advantage of updating the depth/time conversion law upon each iteration of the optimization process.

During this stage, the loop travel times are calculated at the level of the reservoir top. Some hypotheses are therefore formulated: velocities $V_P$ and $V_S$ are assumed to be constant in the subsoil, not only at the level of each grid cell of the reservoir top, but also in the course of time (that is, between the various seismic surveys). Furthermore, the exact composition of the subsoil and its exact geometry are not known: an exact velocity law can therefore not be made explicit. A conventional time/velocity relation is consequently used:

$$T_{top}(i, j) = 2\frac{z_{top}(i, j)}{V_{top}(i, j)} \quad (0.9)$$

with:
$T_{top}(i, j)$: the loop travel time of the P and S waves at the level of grid cell (i,j) of the reservoir top,
$z_{top}(i,j)$: the depth at the level of this cell,
and $v_{top}(i,j)$: the velocity of the P and S waves.

Figure 2:
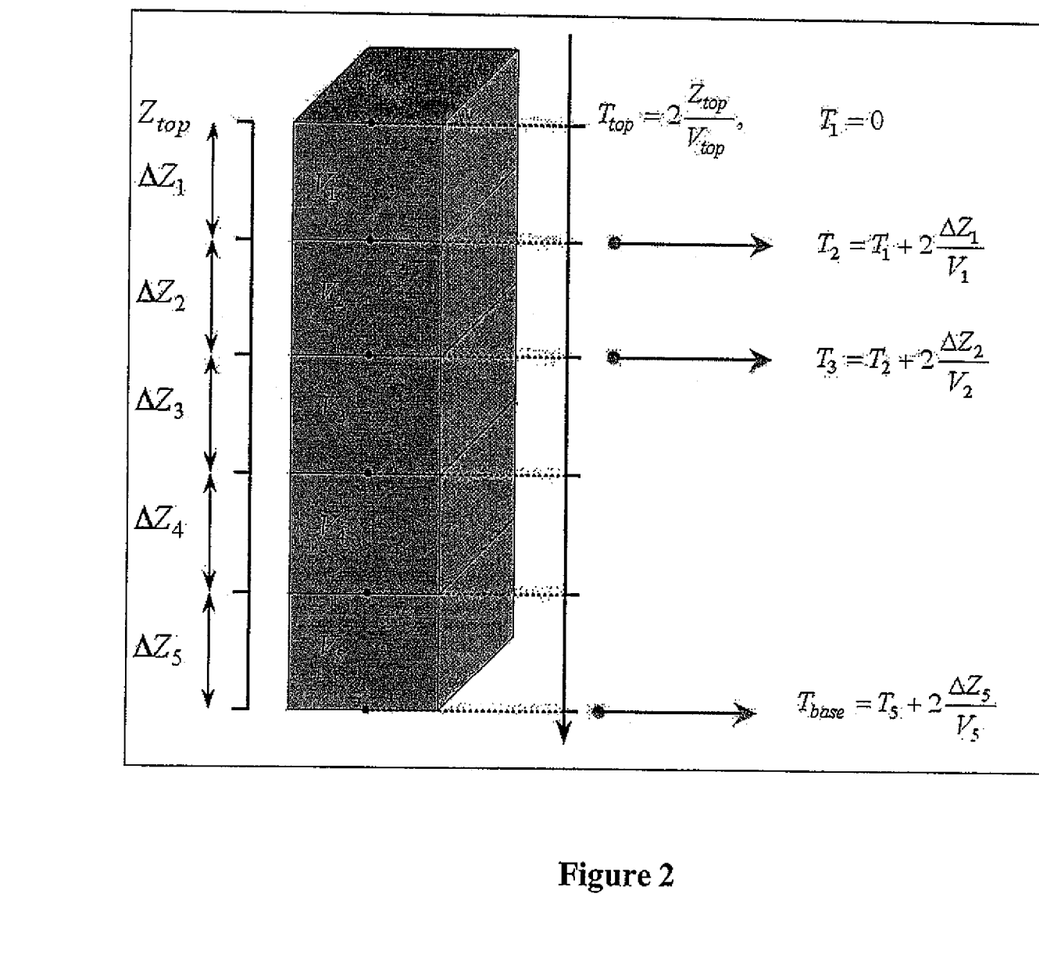
FIG. 2 illustrates the depth/time conversion technique used.

The second stage is the calculation of the loop travel times at the level of each reservoir grid cell. The velocities are assumed to be constant within a cell. Besides, for practical reasons, the top of the reservoir is considered to be the origin of the times: on the one hand, this reduces the calculations and, on the other hand, if the total times are wanted (subsoil and reservoir), the 3D cube thus obtained and the 2D table from the first stage just have to be added. Here again, there is no exact velocity law. Calculation is therefore carried out as illustrated in FIG. 2.

The last stage is the calculation of the loop travel times over the entire reservoir: it is therefore a 2D map that will be of great use during the calibration stage.

3) Filtering of the Petro-Elastic Model in Time 7

Since the geologic model is at a higher frequency than the seismic survey, it is now necessary to return to the frequency band of the seismic method. The compression and shear impedances from the petro-elastic model (See reference 34) are therefore filtered. The filtering function selected (Martin filter) allows a band-pass, a notch, a low-pass or a high-pass filter to be used.

However, the previous stage has introduced a slight difficulty since depth/time conversion has led to a time-irregular discretization. Resampling of the impedances has therefore been implemented. It simply uses an interpolation of order 1 between the top of the reservoir ($T_1$=0) and the travel time over the entire reservoir ($T_{base}$ calculated during conversion). A sampling interval (0.1 ms) much smaller than that of the seismic data (generally 2 ms) is selected in order to have a high accuracy during filtering.

Once filtering is achieved, solution of the seismic data is carried out (generally between 4 and 2 ms) by subsampling the traces obtained.

2—The Inverse Module

FIG. 3 illustrates the various stages of the inverse module.

The goal of the present section is to present the different techniques used during the optimization process: parameterization, weight calculation, formulation of the objective function, optimization techniques.

A) Determination of a Geostatistical Model Parameterization Operation

Parameterization 11 of the geostatistical models is a fundamental point for guaranteeing success of the stage of data integration in the geologic models. In fact, updating the geologic models by means of the dynamic data is based on the solution of an inverse problem. Selection of the parameters to be calibrated thus appears to be essential to minimization of the objective function, which measures the difference between the data observed in the field and the simulation results.

In this example, a particular method is used for generating and changing geostatistical realizations is used: it is a combination of two methods (FFT-MA (See reference 35) and gradual deformations) developed at Institut Français du Pétrole, which separates the generation of white noise and the imposition of a covariance function. The gradual deformation method can thus be applied locally or globally (See References 24, 25 and 26). This selection is carried out for reasons of stability, rapidity and reduction of the number of parameters to be considered for optimization 14 (then equal to the number of gradual deformation parameters whatever the size of the grid).

A deformation chain (See references 36, 39 and 40) is then initiated from a large number of Gaussian white noises, each additional white noise being associated with a new gradual deformation parameter. This allows the space of the white noises to be explored more widely.

B) Recalibration of the Petro-Elastic Model After Depth/Time Conversion: Squeeze/Stretch 6'

This stage is crucial for coherence of the calculations. In fact, nothing guarantees that, during a calibration process, the depth/time conversion provides a travel time map for the entire reservoir that is identical to the reference. Therefore, two sets of data are provided with the same number of values and supposed to be sampled identically. Since the latter point is not necessarily verified, the aim is to constrain the travel time to the entire reservoir, after the depth/time conversion stage.

During the calibration process, an inexact geologic model is generated, which leads to inexact seismic velocities (see direct module 13) and, consequently, a time lag may appear. It then becomes necessary to constrain the calculated thickness in time of the reservoir so that it matches the reference thickness. Thus, the simulated travel times are kept close to the measured travel times and it then becomes coherent to compare the simulated impedances with the reference impedances.

C) Definition of an Objective Function 12

Updating the geologic model by the dynamic data depends on the minimization of an objective function measuring the error between the observed data (production 15 and 4D seismic data 8) and the simulation results obtained for a fixed value of parameters $\theta$.

Several formulations can be envisaged, but the formulation in the sense of the least squares is the most commonly used in the petroleum field. In the present case, the objective function is written as follows:

$$F(\theta) = \frac{1}{2} \frac{2}{nb_{série}} \sum_{i=1}^{nb_{série}} \frac{1}{nb_{mesure}^i} \sum_{j=1}^{nb_{mesure}^i} \left( \frac{obs_j^i - simu_j^i(\theta)}{\sigma_j^i} \right)^2 \quad (2.1)$$

with:
$\theta = (\theta_1, \ldots, \theta_n)$ the vector of the calibration parameters,
$nb_{série}$ the number of series, a series being a type of data (e.g.: Water Cut, Ip to T0, ...),
$nb_{measure}^i$ the number of measurements for series i,
$obs_j^i$ the $j^{th}$ datum measured in series i,
$simu_j^i(\theta)$ the simulation result for the $j^{th}$ datum measured in series i, $\sigma_j^i$ the variance of the $j^{th}$ datum measured in series i.

In matricial form, the following is obtained:

$$F(\theta) = (Obs - Sim(\theta))^T C_{obs}^{-1} (Obs - Sim(\theta)) \quad (0.10)$$

with:
Obs the vector of the measured data,
sim the vector of the simulation results,
$C_{obs}$ the weighted covariance matrix (a diagonal matrix).

D) Definition of an Optimization Technique 14

In the inversion loop, the optimization algorithms used are based on gradient methods (See references 1, 2, 5, 43 and 46) that significantly improve the process performances. The gradients directly provide a descent direction after each simulation.

Note that these optimization methods tend towards a local optimum close to the initial value of the parameters being used. It is consequently judicious to adjust the initial values as well as possible and to analyze the influence of the optimization starting point, for example by conducting sensitivity surveys or by carrying out a sequential optimization.

Various optimization methods are used in the petroleum industry. Examples thereof are the method of deepest descent, the Fletcher-Powell method, the Levenberg-Marquardt method, the Gauss-Newton method and the BFGS method. The books by Chavent (reference 13), Dennis (reference 16) and Fletcher (reference 20) give a detailed account of these methods. Non-linear optimization algorithms allow calculation, according to an iterative procedure, a value $\theta^{opt}$, of parameters $\theta$ that minimizes objective function F to be optimized, which will allow better data calibration.

The object of the iteration (k+1) of such an algorithm is to determine a new estimation of parameters $\theta$ according to the following principle:

$$\theta^{(k+1)} = \theta^{(k)} + t^{(k)} s^{(k)},$$

calculation of a direction: direction $s^{(k)}$ is the solution to a problem linearized with $\theta^{(k)}$. The formulation of this problem is based on the simulation results and on their derivatives with respect to the parameterization, i.e.:

$$D(\theta^{(k)}) \text{ et } \frac{\partial D(\theta^{(k)})}{\partial \theta},$$

linear search: interval $t^{(k)}$ is calculated to meet the descent relation:

$$F(\theta^{(k)} + t^{(k)} s^{(k)}) < F(\theta^{(k)}).$$

The invention claimed is:

1. A method for predicting production of an underground reservoir, including generating a parameterized geologic model from measurements of seismic data in time and measurements of production data, comprising:
   a) using a computer to simulate dynamic production data from the geologic model and a flow simulator providing flow simulations;
   b) using a computer to simulate a petro-elastic model in depth from the geologic model and the flow simulator;
   c) determining a depth/time conversion model;
   d) converting the petro-elastic model in depth into a petro-elastic model in time;
   e) using a computer to simulate the seismic data in time from the petro-elastic model in time;
   f) using a computer to perform an optimization process comprising iterations, to optimize the geologic mode by comparing at each iteration, with an objective function, the simulated dynamic production data and the simulated seismic data in time, and by updating at each iteration at least the depth/time conversion model;
   g) starting again from a) until a minimum is obtained for the objective function; and
   h) predicting the production of the underground reservoir from flow simulations provided by the optimized geologic model.

2. A method as claimed in claim 1, wherein the petro-elastic model in time is adjusted by correction of a lag induced by the depth/time conversion model.

3. A method as claimed claim 1, wherein the dynamic data are reservoir production, pressure and saturation data.

4. A method as claimed in claim 1, wherein the petro-elastic model comprises data from 4D seismic surveys.

5. A method as claimed claim 2, wherein the dynamic data are reservoir production, pressure and saturation data.

6. A method as claimed in claim 2, wherein the petro-elastic model comprises data from 4D seismic surveys.

7. A method as claimed in claim 3, wherein the petro-elastic model comprises data from 4D seismic surveys.

* * * * *